US005678235A

United States Patent [19]

Crowe

[11] Patent Number: 5,678,235
[45] Date of Patent: Oct. 14, 1997

[54] SAFE CERAMIC ENCAPSULATION OF HAZARDOUS WASTE WITH SPECIFIC SHALE MATERIAL

[76] Inventor: General D. Crowe, P.O. Box 1617, Easley, S.C. 29641

[21] Appl. No.: 699,334

[22] Filed: Aug. 19, 1996

[51] Int. Cl.⁶ ........................................... G21F 9/00
[52] U.S. Cl. ................... 588/9; 588/14; 588/252; 588/257; 588/17; 976/DIG. 385
[58] Field of Search ......................... 588/9, 11, 14, 588/15, 257, 252, 17; 976/DIG. 385

[56] References Cited

U.S. PATENT DOCUMENTS

| | | | |
|---|---|---|---|
| 3,900,415 | 8/1975 | Lee et al. | 252/62.51 |
| 3,959,172 | 5/1976 | Brownell et al. | 252/626 |
| 4,173,546 | 11/1979 | Hayes | 588/4 |
| 4,853,208 | 8/1989 | Reimers et al. | 423/659 |
| 5,302,565 | 4/1994 | Crowe | 501/141 |

FOREIGN PATENT DOCUMENTS 0313016  4/1989  European Pat. Off. .

*Primary Examiner*—Ngoclan Mai
*Attorney, Agent, or Firm*—Low and Low

[57] ABSTRACT

A safely encapsulated hazardous waste product free of unwanted leaching of contaminated metal constitutents and process therefor wherein a quantity of hazardous waste and a quantity of shale material characterized by having an aluminosilicate content containing at least 9.35% by weight of $Fe_2O_3$, wherein the shale is reduced to a fine mesh before mixing, and defines a brick-like form as fired at about 1,150° C. for a period of time to change the shale material into a semi-molten state and thereafter cooled to safely encapsulate the waste within the shale as a unit-handled product. The product of the invention satisfies and exceeds RCRA and LDR (EPA) requirements as shown by Toxicity Characteristic Leaching Procedure (TCLP) results.

10 Claims, No Drawings

SAFE CERAMIC ENCAPSULATION OF HAZARDOUS WASTE WITH SPECIFIC SHALE MATERIAL

CROSS-REFERENCE TO RELATED PATENT

This application is related to my prior U.S. Pat. No. 5,302,565, granted Apr. 12, 1994, the disclosure of which is incorporated herein by reference.

BACKGROUND OF THE INVENTION

The proper and safe long term disposal and storage of hazardous and toxic waste, as nuclear materials and numerous other industrial solid, sludge, soil, and sediment by-products or remainder materials, has been and remain a major concern for manifest safety and environmental concerns.

Efforts had long been made to safely store nuclear and like toxic waste by diverse particulate encapsulation by ceramic type materials, as glasses, but have been uniformly unsuccessful for various reasons, including attack of the ceramic material by diverse salts with consequent leakage or exposure of the waste.

In applicant's prior patent, applicant had invented a unique ceramic composition including a high iron and high potassium aluminosilicate, preferably a specific Roan red shale, which could be effectively vitrified at high temperature. Further, the shale was employed to form a container to receive and safely encapsulate the hazardous and toxic waste for long term storage.

SUMMARY OF THE INVENTION

I have found through additional research and testing that the novel composition of my invention shown in the patent is not only capable of safely handing waste materials when fired into container form for receiving a charge of waste, but also can be utilized to safely mold over, cover and encapsulate discrete solid hazardous waste materials on a particulate or lump basis, and in the absence of any separate enclosing container. As so encapsulated, the waste is leach proof and can be stored on-site.

A container as taught by my patent may additionally be utilized if desired for a maximum, virtually unlimited, time storage, but mere particulate encapsulation of the material by appropriate vitrification by itself achieves storage capability as required by regulatory agencies.

Further, the safely encapsulated waste of my invention, by virtue of the non-leachability of the product, may be employed for diverse utilitarian purposes, as subterranean drainage tile, aggregate for fill and like purposes, reformation into hazardous waste containers, and other possible uses.

My composition as previously disclosed is vitrified for waste storage and protection purposes, such waste embracing low level and high level radioactive tastes, as well as solids such as sludges, soils, and sediments that have been contaminated with heavy metals, and further study has developed specific techniques for achieving excellent particulate waste encapsulation.

Further, such safety treatment can be performed in situ at waste sites, therefore beneficially requiring absolute minimum handling and transportation of the hazardous material.

DESCRIPTION OF THE PREFERRED EMBODIMENT

Low level and high level radioactive wastes, as well as solids such as sludges, soils, and sediments that have been contaminated with heavy metals, and mixtures thereof after treatment, are permanently entrapped in the ceramic of the invention which has an exceptionally low porosity. Indeed, numerous leach tests of the inventive encapsulation herein result in leach quantities below the detection limit for many contaminates.

The unique material employed in the waste encapsulation process is substantially that disclosed and described in my prior U.S. Pat. No. 5,302,565, a naturally occurring Roan red shale of an aluminosilicate with at least 9.35% by weight of $Fe_2O_3$, and also a high potassium content on the order of at least 9.89% $K_2O$.

In a process similar to brickmaking, the aluminosilicate is mixed in a water slurry with the contaminated waste, as contaminated soil waste, to a relative thickness or density to permit extruding the same. Thereafter, the extrudate with the contaminants is fired in a kiln to dry and vitrify the same.

The firing time is on the order of 24 hours at temperatures in excess of 2,100° F., for example. During the elevated temperatures of the firing process, the waste metal ions are encapsulated by the minerals within the ceramic material. Thus, the permanent and safe encapsulation is achieved by surrounding and entrapping the undesirable heavy metal ions by the nearly molten ceramic material, whereby upon cooling the metal waste is securely and permanently sealed.

As with any firing operations, environmental care is taken with the exhaust gases, and especially so with the treatment of hazardous wastes. Appropriate and known bag house techniques are practiced, with special attention to avoid general atmospheric contact.

The leach proof nature of the encapsulation is shown by one actual test sample #910474-C, wherein illustrative metal leaching under standardized Toxicity Characteristic Leaching Procedure (TCLP) techniques was determined. This test procedure appears in the EPA Code of Federal Regulations at 40 CFR 260, Appendix II (Method 1311). The results found are as follows from the ceramic product, and wherein the metal content in the sample is also shown:

| Toxicity Characteristic Leaching Procedure (TCLP) | | |
|---|---|---|
| METAL | CONTENT | LEACH RESULT |
| Arsenic (As) | <1 ppm | <0.210 mg/l |
| Barium (Ba) | 28 ppm | 0.204 mg/l |
| Cadmium (Cd) | 14 ppm | <0.004 mg/l |
| Chromium (Cr) | 10,300 ppm | <0.010 mg/l |
| Lead (Pb) | 298 ppm | <0.065 mg/l |
| Mercury (Hg) | 0.005 ppm | <0.002 mg/l |
| Selenium (Se) | 0.57 ppm | <0.010 mg/l |
| Silver (Ag) | <1 ppm | <0.010 mg/l |

It is evident that there is no material leaching of metal of any concern in the tested sample.

In another testing of applicant's product, in sample #92-25264 including specifically radioactive components, the 90-day leach test results were:

| METAL | LEACH RESULT |
|---|---|
| Americum-241 | <1 pCi/liter |
| Cadmium | <0.05 mg/liter |
| Lead | <0.05 mg/liter |
| Plutonium-239 | <1 pCi/liter |

These are exceedingly favorable results from the inventive material and technique. Various glass and cement materials which have been tested for hazardous waste control by efforts to surround the waste show far higher and unwanted leach rates. The subject encapsulation using the shale based material is also shown to be unaffected by attack from salts.

A more extensive test was made using the shale of the prior patent with a waste sludge including hazardous heavy metal components, wherein the waste solids, before mixing with 50% water to form the sludge, comprised:

| Component | Additive Wt. % | Oxide Basis Wt. % |
|---|---|---|
| CaSO$_4$ | 36.57 | 24.65 |
| Fe$_2$O$_3$ | 21.89 | 35.81 |
| MgOH$_2$ | 12.16 | 13.75 |
| NaNO$_3$ | 19.56 | 11.67 |
| Diatomaceous Earths: | | |
| SiO$_2$ | 8.14 | 11.99 |
| Fe$_2$O$_3$ | 0 | 0.31 |
| Al$_2$O$_3$ | 0 | 0.87 |
| Ce$_2$(CO$_3$)$_3$ 5H$_2$O | 0.16 | 0.16 |
| Cr(NO$_3$)$_3$ 9H$_2$O | 0.63 | 0.19 |
| Ni(NO$_3$)$_2$ 6H$_2$O | 0.41 | 0.17 |
| Pb(NO$_3$)$_2$ | 0.13 | 0.14 |
| Cd(NO$_3$)$_2$ 4H$_2$O | 0.23 | 0.15 |

The red Roan shale of U.S. Pat. No. 5,302,565 was crushed and ground to a particle size of -140 mesh (U.S.) and mixed with equal parts of the waste sludge to achieve a slip with appropriate viscosity for casting. The material was cast into 50 mm. right cylinder plastic molds resting on a flat plaster base.

After about one hour setup time, the green disk samples about 46 mm. in diameter and 8 mm. in height were placed in a drying oven and dried at 110° C. (230° F.) for 12 hours to remove free water, and then fired, initially to 1,150° C. (2,102° F.) at the rate of 3° C./min. After a ten minute soaking at temperature, the disks were allowed to cool to 800° C. (1,472° F.) and soaked at this temperature for 10 hours. After cooling, the disks were brick-like, hard, and of brick red color.

As with the tests above, a TCLP analysis was done which showed that leaching was nominal, with metals stabilized in the ceramic product, thus, illustratively:

| METAL | LEACH RESULT | RCRA[1] LIMIT | LDR[2] LIMIT |
|---|---|---|---|
| Cadmium | 0.17 mg/l | 1.00 mg/l | 0.19 mg/l |
| Chromium | 0.54 " | 5.00 " | 0.84 " |
| Lead | 0.13 " | 5.00 " | 0.37 " |
| Silver | 0.20 " | 5.00 " | 0.30 " |
| Nickel | 0.04 " | NA | 5.00 " |

[1]RCRA refers to requirements of the Resource Conservation and Recovery Act
[2]LDR refers to EPA Land Disposal Restrictions As before, leaching from the ceramic product is virtually nominal and well within environmental requirements as noted by RCRA and LDR postulates.

Variants within my inventive system will be evident from the above description and within the scope of the appended claims.

What I claim is:

1. A safely encapsulated hazardous waste product free of unwanted leaching of metal consitutents comprising, a quantity of hazardous waste, a quantity of shale material, said shale material being characterized by the inclusion of an aluminosilicate containing at least 9.35% by weight of Fe$_2$O$_3$, said shale material having been reduced to a fine mesh and mixed with said waste, said mixture defining a brick-like form and having been fired at about 1,150° C. for a period of time to change the shale material into a semi-molten state and thereafter cooled, thereby safely encapsulating said waste within the shale material as a unit-handled product.

2. The safely encapsulated hazardous waste product of claim 1 wherein said shale material further includes at least 9.89% by weight of K$_2$O.

3. The safely encapsulated hazardous waste product of claim 1 wherein the product is ground to a desired size for use as aggregate.

4. The safely encapsulated hazardous waste product of claim 1 wherein the product is ground to a desired size for use as subterranean drainage tile.

5. The safely encapsulated hazardous waste product of claim 1 wherein the product satisfies Toxicity Characteristic Leaching Procedure (TCLP) wherein metal leaching from the encapsulated product is within EPA standards.

6. The safely encapsulated hazardous waste product of claim 5 wherein the toxicity leaching is within RCRA and LDR standards.

7. A process for safely encapsulating hazardous waste products to prevent toxic metal leaching therefrom comprising the steps of:

providing a quantity of hazardous waste, providing a quantity of shale material having an aluminosilicate containing at least 9.35% by weight of Fe$_2$O$_3$, mixing said waste with water to form a sludge, mixing said sludge with said shale material, reducing the mixture to a fine mesh, casting the mixture into a form, firing the mixture at high temperature to produce a brick-like product, cooling the product, thereby to produce an encapsulated waste product from which metals do not leach to an undesired extent.

8. The process of claim 7 wherein the shale material further includes at least 9.89% by weight of K$_2$O.

9. The process of claim 7 wherein the product is ground into particles for use as an aggregate material.

10. The process of claim 7 wherein the product is ground into particles for use as a subterranean drainage tile.

* * * * *